(12) United States Patent
Auell

(10) Patent No.: US 7,295,392 B2
(45) Date of Patent: Nov. 13, 2007

(54) COLOR WHEEL WITH ALIGNED SEGMENTS

(75) Inventor: Adam Auell, Morrison, CO (US)

(73) Assignee: OC Oerlikon Balzers AG, Balzers (LI)

( * ) Notice: Subject to any disclaimer, the term of this patent is extended or adjusted under 35 U.S.C. 154(b) by 0 days.

(21) Appl. No.: 11/379,292

(22) Filed: Apr. 19, 2006

(65) Prior Publication Data

US 2006/0238909 A1 Oct. 26, 2006

Related U.S. Application Data

(60) Provisional application No. 60/674,207, filed on Apr. 22, 2005.

(30) Foreign Application Priority Data

Jun. 22, 2005 (DE) ............. 10 2005 029 296

(51) Int. Cl.
*G02B 5/22* (2006.01)
(52) U.S. Cl. ............. 359/891; 359/885; 359/889; 353/84; 348/743; 356/418
(58) Field of Classification Search ........... 359/891, 359/892, 885, 889; 353/84; 348/743; 356/418
See application file for complete search history.

(56) References Cited

U.S. PATENT DOCUMENTS

| 5,868,482 | A |   | 2/1999 | Edlinger |
|---|---|---|---|---|
| 6,011,662 | A | * | 1/2000 | Evans ............ 359/891 |
| 2004/0233279 | A1 |   | 11/2004 | Chang |
| 2005/0128614 | A1 |   | 6/2005 | Kao et al. |

FOREIGN PATENT DOCUMENTS

JP 2004101827 A 4/2004

OTHER PUBLICATIONS

International Search Report, PCT/CH2006/000213, Jun. 29, 2006.

* cited by examiner

*Primary Examiner*—Leonidas Boutsikaris
(74) *Attorney, Agent, or Firm*—Pearne & Gordon LLP

(57) ABSTRACT

A color wheel for use in projector systems comprises a disc shaped hub, rotatable around a central axis and color filter segments arranged radially to said central axis and affixed to said hub. This color ring is arranged concentrically with respect to said axis and said segments' contour comprising an outer arc, an inner arc and two radial parts. Each of the radial parts comprises a recess arranged such that during assembly of said segments pairs of neighboring recesses form a hole which again engages in a corresponding peg on the hub in a form fitting manner.

9 Claims, 5 Drawing Sheets

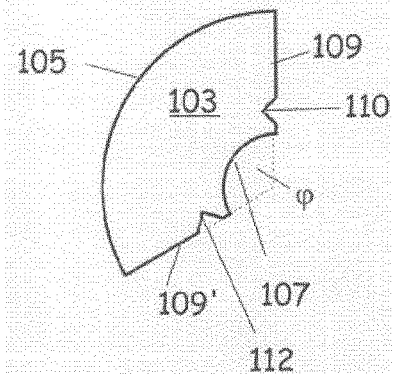
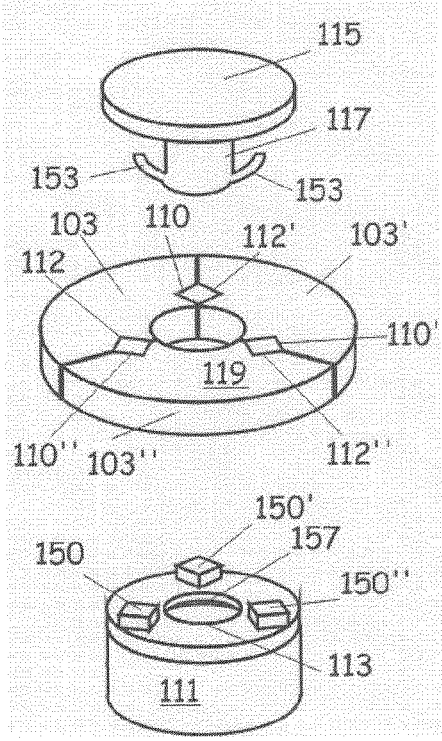
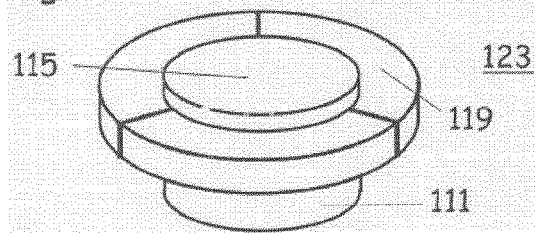

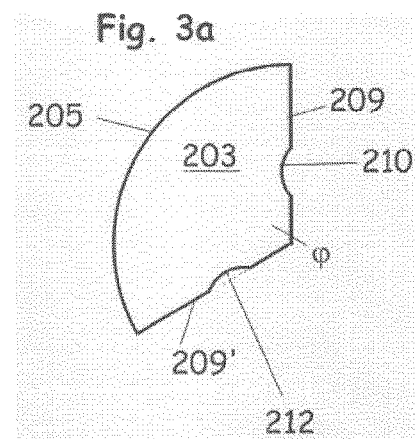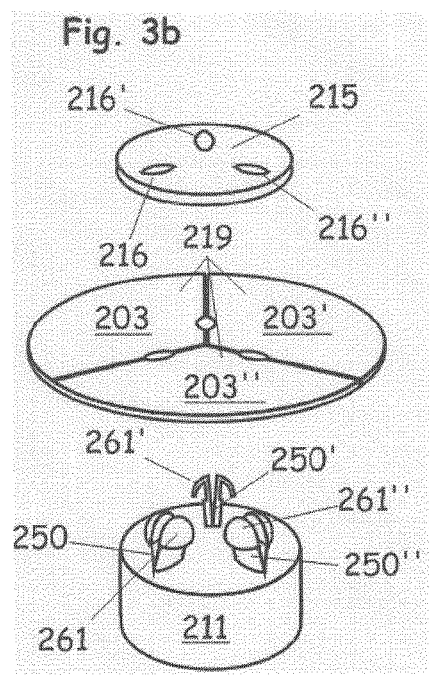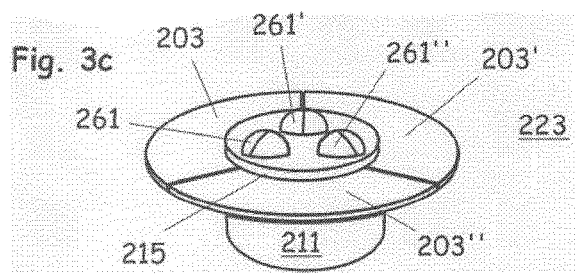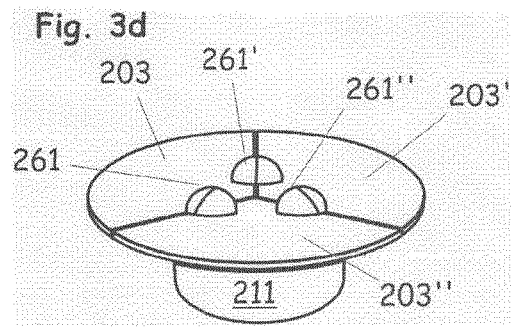

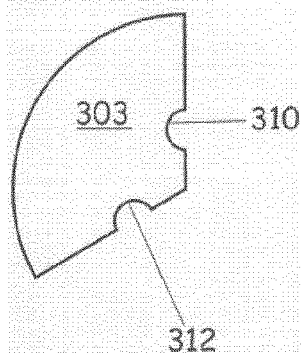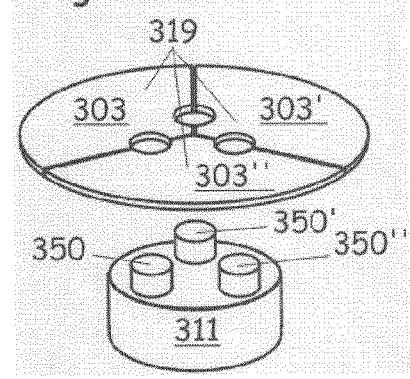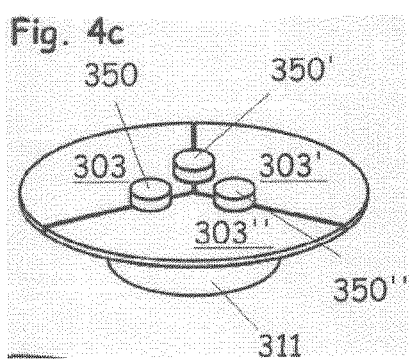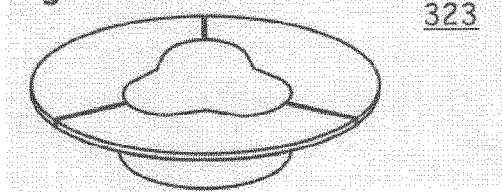

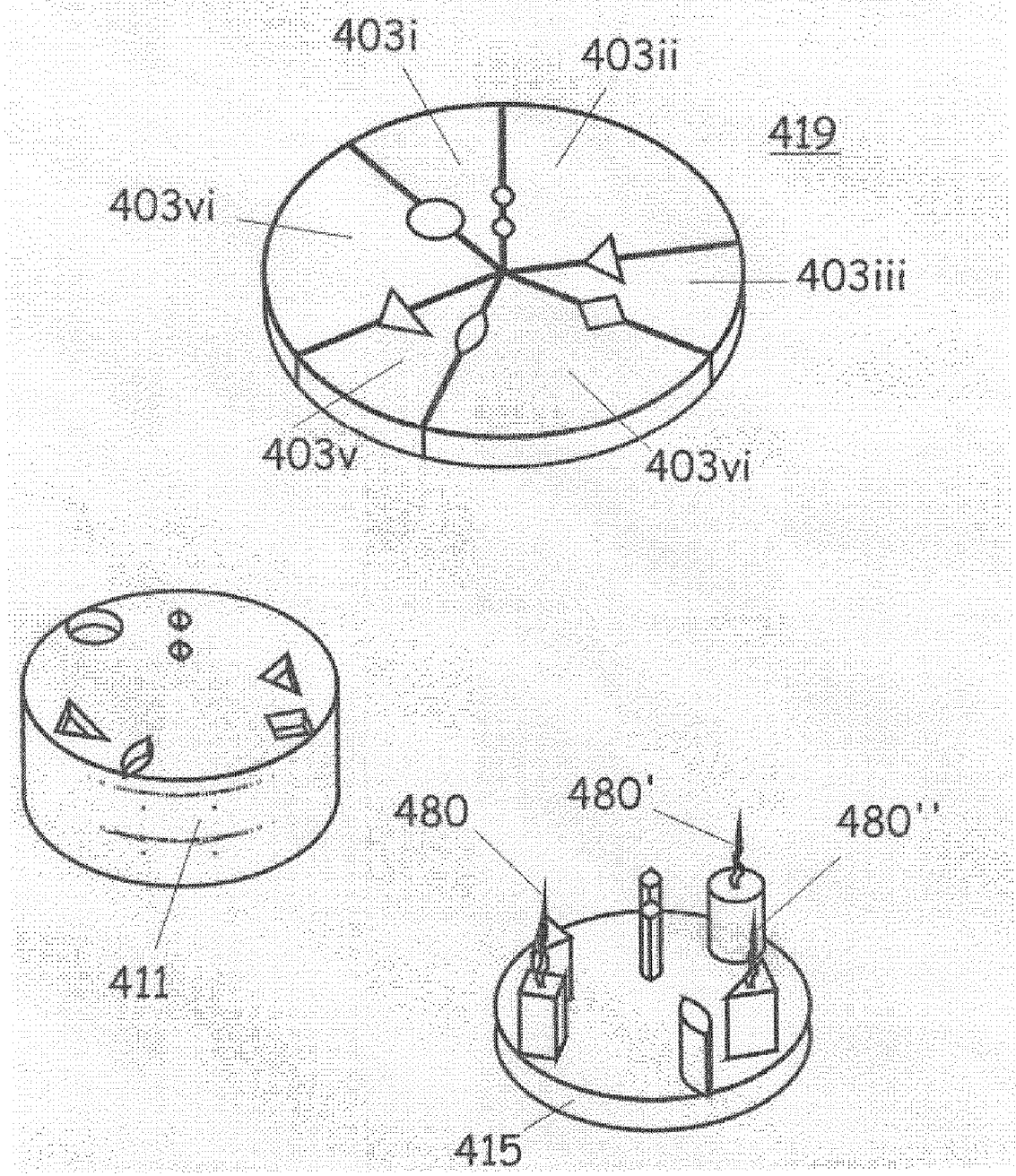

COLOR WHEEL WITH ALIGNED SEGMENTS

FIELD OF THE INVENTION

This disclosure relates to a rotatable color wheel for use in projector systems to enable color sequential illumination of an image panel

BACKGROUND OF THE INVENTION

Most of the image projection apparatus for producing colored images on a screen either only comprise one image panel: In order to form a colored image the panel needs to be sequentially illuminated with light beams of different colors. If the sequence is displayed fast enough the human eye is not able to timely resolve the resulting color image sequence. As a result the impression of a colored image develops. One method to realize the required sequential illumination is to place dichroic filter segments secured on a rotatable hub in the path of a light beam. Since the rotation of such a color wheel needs to be quite fast, strong centrifugal forces act on the dichroic filters and the means for securing them to the rotatable hub need to provide sufficient stability.

In most cases it is sufficient to use an adhesive only to attach the color filter segments to the hub. U.S. Pat. No. 5,868,482 (Edlinger) discloses such a color wheel comprising a disc shaped carrier and color filter segments attached to the periphery of the disc shaped carrier using an epoxy adhesive. Unfortunately the disclosure tells nothing about the alignment of these color filter segments to the disc shaped carrier. Alignment is crucial because due to the fast rotation the wheel needs to be well balanced and if the segments are not well aligned to the disc shaped carrier additional means for balancing are required. Each step of the assembly comprising applying adhesive, aligning the segments, curing the adhesive and balancing the wheel takes time and hardly allows for standardized or automated procedure.

In addition in some cases it seems to be not sufficient to secure the segments by adhesive only. Sometimes in cases for which, based on force calculations, the "adhesive only" assembly seems to be not sufficient additional mechanical securing means are required. In such cases according to prior art, holes in the filter segments and screws are used to additionally secure the segments to the disc shaped carriers. Unfortunately it is a complicated procedure and the procedure to drill holes into glass and secure the segments with screws results in decreased durability of the segments.

In U.S. Pat. No. 6,011,662 a color wheel is provided that has changeable filter elements. Here a hub has specific filter holding structures, including a spring element along the periphery of the hub. Each color element is mounted on a platform component. The platform component is shaped with concave edge elements that engage corresponding pegs on the hub and a downwardly extending nub that engages with a corresponding cavity in the hub. The platform component has a beveled insertion edge on the top side. The hub has a plurality of pegs and nub cavities. The color element is inserted into the hub and pressed down. The concave edge elements engage the pegs. The nub is inserted into the nub cavity. The color element is held in position on the hub by those structures as long as the bottom surface of the color element is pressed down against the hub. The spring element extends just past the beveled edge on the platform component of the color element. The color element can be lifted from the hub by first lifting the spring element.

The U.S. Pat. No. 6,011,662 is intended to provide a color wheel with easily changeable, user-selected dichroic filters. As can be seen from the description above the system is rather complicated: Filter segments need to be secured to platforms, which comprise springs etc. Therefore this is a rather expensive solution and one skilled in the art would, in his intention to realize a simple and cheap assembly, avoid this way.

SUMMARY OF THE INVENTION

It is the goal of the present invention to, at least partially, provide a solution for the above mentioned problems with prior art. Special focus is given to provide an assembly method, which results in self alignment of the segments and a single step freezing and therefore securing of the color filter segments to a hub. The resulting color wheel, assembled with this method, requires if any only minor balancing effort, is lightweight and cheap.

In the solution according to the present invention a color wheel is provided with a hub. The color filter segments are formed out of a single piece body and are shaped with concave edge elements that engage in corresponding pegs provided on the hub or on additional means, which are used to axially secure the segments to the hub. In contrast to prior art solutions no additional platform is required to secure the color wheel segments to the hub. Such additional means can be for example a plastic ring. Securing is performed for example by chemical bond, mechanical snap mechanism ultrasonic welding or other suitable measure

BRIEF DESCRIPTION OF THE DRAWINGS

FIG. 2a Color wheel segment according to first embodiment of invention

FIG. 2b Explosion view of color wheel assembly according to first embodiment

FIG. 2c Assembled color wheel according to first embodiment of invention

FIG. 3a Color wheel segment according to second embodiment of invention

FIG. 3b Explosion view of color wheel assembly according to second embodiment of invention FIG. 3c Assembled color wheel according to second embodiment of invention with securing disc FIG. 3d Assembled color wheel without securing disc FIG. 4a Color wheel segment according to third embodiment of invention FIG. 4b Explosion view of color wheel assembly according to third embodiment of invention FIG. 4c Assembled color wheel according to third embodiment of invention, segments not yet secured to the hub FIG. 4d Assembled color wheel according to the wheel of FIG. 4c, securing performed by heat melting FIG. 5 Explosion view of color wheel assembly according to fourth embodiment of invention.

DETAILED DESCRIPTION OF THE PREFERRED EMBODIMENT

Figure 1A:
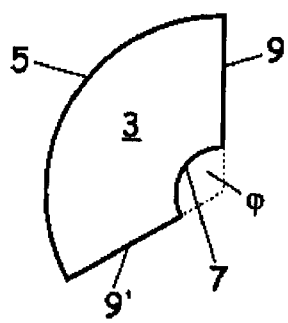
FIG. 1a Prior art color wheel segment
Figure 1B:
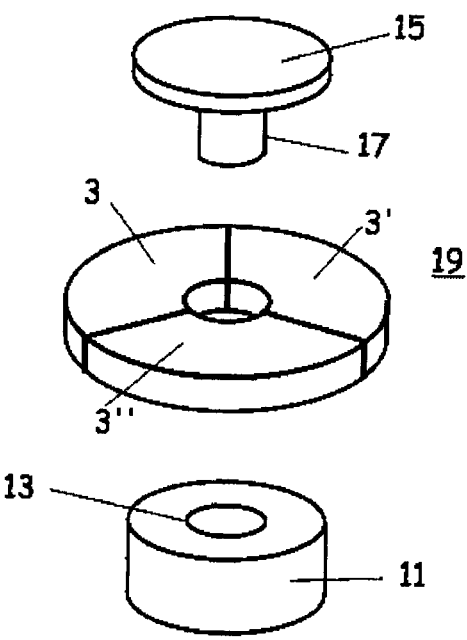
FIG. 1b Explosion view of prior art color wheel
Figure 1C:
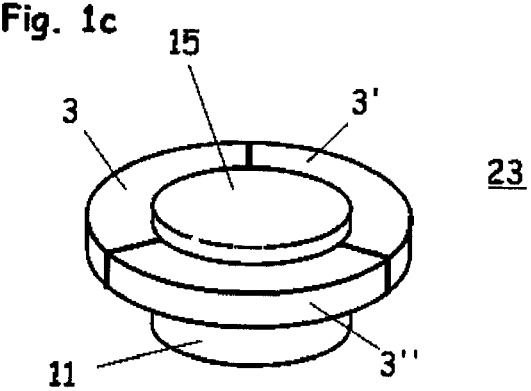
FIG. 1c Assembled prior art color wheel

In the following the invention is described with the help of the figures in more detail. Several preferred embodiments are discussed. However in the next section a typical prior art solution will be described first in order to specifically point out the advantages of the present invention over prior art. The sequence of FIG. 1a to 1c shows the assembly of the prior art solution. FIG. 1a shows a color wheel segment 3 the contour comprising an outer circular arc 5 an inner circular arc 7 and two linear radial parts 9,9'. In this example the interpolation of the lines along the two linear radial parts 9,9' to their crossing point include an angle φ of 120°. Therefore three of such segments 3, 3' and 3", as shown in FIG. 1b form a complete color ring 19. Each of the segments 3, 3' and 3" can comprise a color filter which differs from the others. For example segment 3 could comprise a blue transmission filter defined as transmitting wavelengths from 420 nm to 500 nm and reflecting the rest of the visible light, segment 3' could comprise a red transmission filter, the filter defined as transmitting wavelengths from 600 nm to 680 nm and reflecting the rest of the visible light and the segment 3" could comprise a green transmission filter, the filter defined as transmitting wavelengths from 500 nm to 600 nm and reflecting the rest of the visible light. The number of segments to form the ring can be different from 3 and wheels could be formed comprising segments comprising the identical optical filters. The angle φ may be chosen individually for each segment, as long as the sum of the angles equals 360° to form a ring. However for the purpose of the present invention it is sufficient to describe examples with 3 segments only which does not mean that the invention is limited to 3-segment assemblies.

Referring further to FIG. 1b, which shows the explosion view of a prior art color wheel assembly, the color ring 19 is secured to a hub 11. In some prior art solutions securing is performed gluing the segments to the hub, using an adhesive. Sometimes, as shown in FIG. 1b the hub 11 comprises a cylindrical hole 13 and a securing disc 15 with a securing cylinder 17. During assembly the securing cylinder 17 is pressed into the cylindrical hole 13 and as a consequence the securing disc 15 is penning in the segments 3,3',3". In other words the color ring 19 is sandwiched between the hub 11 and the securing disc 15. In this case the hub 11 as well as the securing disc 15 and the securing cylinder are made of metal in order to guarantee a good mechanical contact and to withstand the radial forces the segments exert on the contact between securing disc and segments or between hub and segments.

FIG. 1c finally shows the assembled color wheel 23 according to prior art. Please note that according to the example described, the color wheel segments comprised single piece bodies which were glued to the hub and sandwiched between the hub and a securing disc.

The sequence for FIGS. 2a to 2c shows segments, and assembly of a color wheel according to a first preferred embodiment of the present invention. FIG. 2a shows a color wheel segment 103 with a contour that comprises an outer circular arc 105 and an inner circular arc 107 and two radial parts 109, 109'. Each of the radial parts 109, 109' comprises at least one triangular shaped recess 110, 112. When three of such color wheel segments 3,3',3" are put together to form a complete color ring 119, the pairs of neighboring recesses 110, 112' of neighboring segments form a rectangular hole. The segments are placed on a hub in such a way that the recesses engage in corresponding pegs 150, 150' and 150" in a form fitting manner. With these pegs engaging in the recesses of the segments the segments are well aligned to the hub and no additional adjustment procedure is required. In the example as described here the height of the pegs 150, 150' 150" is less than the thickness of the glass segments 103, 103', 103". Glass segments could be, for example 1.2 mm thick and pegs could be 1 mm in height. In the same way as already described for prior art solutions the hub 111 comprises a cylindrical hole 113 and the color ring 119 is sandwiched between a securing disc 115 and the hub 111, whereby a securing cylinder 117 foreseen at the securing disc 115 engages and is pressed into the cylindrical hole 113. In order to secure the disc to the hub an anchor principle can be used as option or in addition to pressing a securing cylinder 117 into a cylindrical hole 113. Such an anchor principle requires an anchor 153 foreseen at the securing cylinder 117 and an additional recess 157 foreseen within the cylindrical hole 113 of the hub 111. One of the advantages with using pegs 150, 150' and 150" which engage form fitting into the recesses 110, 110' 110" and 112, 112', 112" is that the color wheel segments are by this automatically aligned to the hub. However, another, major advantage of the use of pegs and recesses is that once the segments are axially fixed to the hub by means of for example the securing disc 115, the rather strong radial forces, when rotating the wheel as required will act mainly upon the pegs 150, 150' and 150". In other words the means for withstanding the strong radial forces are mechanical means in form of pegs foreseen on the hub 111 and these means are well separated from the means for axially securing the segments to the hub. This is why for example the hub 111 and/or the securing disc 115 together with the securing cylinder 117 and, if any, the anchor 153 could be formed out of plastic which is cheap to produce. In addition this allows an assembly without the use of adhesive.

It is clear, that the pegs to engage into the recesses of the segments could be as an option, foreseen at the bottom side of the securing disc 115. As already mentioned in this example the height of the pegs needs to be less than the thickness of the segments in order be able to effectively press the securing disc to the segments.

This is very different with the second embodiment of the present invention as shown in the sequence of FIG. 3a to 3d. In order to give different examples of recesses, the segment as shown in FIG. 203 comprises concave recesses located at the radial parts 209, 209' of the its contour. Note that in this embodiment of the present invention the contour only comprises an outer circular arc, no inner circular arc is required, the inner part could be of any shape as long as the shape does not affect the stability or the optically usable zone. Three of such segments 203, 203', 203" are then put together as shown in FIG. 3b to form a color ring 219 with the recesses forming approximately oval shaped holes. This assembling can be done on the hub 211 and the segment will be well aligned because of the pegs 250, 250' and 250". Special with this embodiment is that the pegs 250, 250' and 250" foreseen on the hub 211 themselves form oval cylinders with heads to act as anchors. This time the height of the oval parts of the pegs correspond to the thickness of the segments. If now the segments 203, 203', and 203" are placed on the surface of the hub 211 the pegs together with their heads act as anchors and sufficiently secure the segments to the hub, without using an additional securing disc. Such an assembled wheel is shown in FIG. 3d. In the FIG. 3b shown are cleaved pegs 250, 250' and 250". However, the one skilled in the art knows different variations of this anchor principle to be applied here. It is for example well possible that rather than cleaving the pegs, the heads of the pegs are deformable in order to allow the assembly. As another option an additional securing disc 215, comprising oval holes 216, 216' and 216" but this time not comprising a securing cylinder can be used as shown in FIG. 3b and FIG. 3c. FIG. 3c shows the finally assembled color wheel 223 comprising such a securing disc 215. If the securing disc 215 is used the height of the pegs 250, 250' and 250" needs to be adjusted.

In a third embodiment of the present invention, as shown in the figure sequence 4a to 4d semicircular recesses 310 and 312 are realized within the radial parts of the contour of the segment 303. In FIG. 4b three of such segments are put together and a hub 311 with pegs 350, 350', 350" is provided which, as shown in FIG. 4c engage into the recesses of the segments which form circular holes. The height of the 350, 350', 350" is well above the thickness of the segments. Axial securing can then be performed for example just by melting the upper parts of the pegs, as shown in the readily assembled wheel in FIG. 4d.

According to another aspect of the present invention the pegs engaging into the recesses could be used to facilitate assembly procedures. Especially, but not only, in cases where more than 3 segments are used to form the color ring it is quite important to place the correct neighboring segments next to each other. Incorrect placement of the segments results in low yield. In order to prevent these incorrect placements it is possible to give the recesses and the corresponding pegs on the hub or on the securing disc different specific geometrical forms. Only the correct neighboring segments may then be placed and assembled. Shown in FIG. 5 is an embodiment, where the securing disc 415 comprises pegs in form of prisms, cylinders, cubes and different geometrical shape. (No references are shown for the pegs in order not to overload the figure) and the hub 411 comprises the corresponding recesses to let the pegs engage into the recesses. Shown in addition is another type of mechanical fixture. Some of the pegs of the securing disc comprise screws 480, 480', 480", to secure the securing disc to the hub.

REFERENCE NUMERALS 3 color wheel segment
3' color wheel segment
3" color wheel segment
5 outer circular arc
7 inner circular arc
9 linear radial part
9' linear radial part
11 hub
13 cylindrical hole
15 securing disc
19 color ring
23 color wheel
103 color wheel segment
103' color wheel segment
103" color wheel segment
105 outer circular arc
107 inner circular arc
109 linear radial part
109' linear radial part
110 recess
110' recess
110" recess
111 hub
112 recess
112' recess
112" recess
113 cylindrical hole
115 securing disc
117 securing cylinder
119 color ring
123 color wheel
150 peg
150' peg
150' peg
153 anchor
157 recess
203 color wheel segment
203' color wheel segment
203" color wheel segment
210 recess
212 recess
209 radial part of contour
209' radial part of contour
205 outer circular arc
211 hub
215 securing disc
216 oval hole
216' oval hole
216" oval hole
219 color ring
250 peg
250' peg
250" peg
261 head of peg
261' head of peg
261" head of peg
223 color wheel
303 color wheel segment
303' color wheel segment
303" color wheel segment
310 recess
312 recess
311 hub
319 color ring
350 peg
350' peg
350" peg
323 color wheel
403i color wheel segment
403ii color wheel segment
403iii color wheel segment
403iv color wheel segment
403v color wheel segment
403vi color wheel segment
hub
411 securing disc
415 color ring
419 screw
480 screw
480' screw
480" screw

What is claimed is:

1. A color wheel for use in projector systems comprising:
a disc shaped hub rotatable around a central axis and color filter segments each being formed out of a single piece body of plane glass substrate, arranged radially to said central axis and affixed to said hub; thereby forming a color ring, concentrically arranged with respect to said axis;
said segments' contour comprising an outer arc, an inner arc and two radial parts;

each of the radial parts comprising a recess arranged such that during assembly of said segments pairs of neighboring recesses form a hole which again engage in corresponding pegs on the hub in a form fitting manner.

2. Color Wheel according to claim 1 wherein the height of the pegs is less or equal than the thickness of the filter segments.

3. Color Wheel according to claim 1 further comprising a securing disc wherein the color ring is sandwiched between the hub and the securing disc.

4. Color Wheel for use in projector systems comprising:
a disc shaped hub rotatable around a central axis and color filter segments being formed out of a single piece body arranged radially to said central axis and affixed to said hub; thereby forming a color ring, concentrically arranged with respect to said axis;
said segments' contour comprising an outer arc, an inner arc and two radial parts;
each of the radial parts comprising a recess arranged such that during assembly of said segments pairs of neighboring recesses form a hole which again engage in corresponding pegs on the hub in a form fitting manner;
further comprising a securing disc wherein the color ring is sandwiched between the hub and the securing disc, wherein the securing disc further comprises a securing cylinder matching with at least one anchor, said cylinder matching a cylindrical hole in the hub and the anchor securing the cylinder in the hole.

5. Color Wheel for use in projector systems comprising:
a disc shaped hub rotatable around a central axis and color filter segments being formed out of a single piece body, arranged radially to said central axis and affixed to said hub; thereby forming a color ring, concentrically arranged with respect to said axis;
said segments' contour comprising an outer arc, an inner arc and two radial parts;
each of the radial parts comprising a recess arranged such that during assembly of said segments pairs of neighboring recesses form a hole which again engage in corresponding pegs on the hub in a form fitting manner, wherein the pegs comprise heads acting as anchors to secure the filter segments to the hub without additional securing disc.

6. A color wheel for use in projector systems comprising:
a disc shaped hub rotatable around a central axis and color filter segments each being formed out of a single piece body of plane glass substrate, arranged radially to said central axis and affixed to said hub; thereby forming a color ring, concentrically arranged with respect to said axis;
said segments' contour comprising an outer arc, an inner arc and two radial parts;
each of the radial parts comprising a recess arranged such that during assembly of said segments pairs of neighboring recesses form a hole which again engage in corresponding pegs on the hub in a form fitting manner, wherein the recesses of the filter segments have different specific geometrical forms, and
correspondingly formed pegs on the hub so only correct neighboring segments can be placed and secured to the hub.

7. Color Wheel according to claim 3, wherein the recesses of the filter segments have different specific geometrical forms, and correspondingly formed pegs on the hub so only correct neighboring segments can be placed and secured to the hub.

8. Color Wheel according to claim 5, wherein the recesses of the filter segments have different specific geometrical forms, and correspondingly formed pegs on the hub so only correct neighboring segments can be placed and secured to the hub.

9. Color Wheel according to claim 1, wherein the color filter segment is mounted directly to the hub.

* * * * *